Aug. 26, 1958
L. J. BERBERICH ET AL
COMPOSITE GASEOUS INSULATION CONTAINING
HIGHLY FLUORINATED ORGANIC COMPOUNDS
FOR ELECTRICAL APPARATUS
Filed June 30, 1953
2,849,525
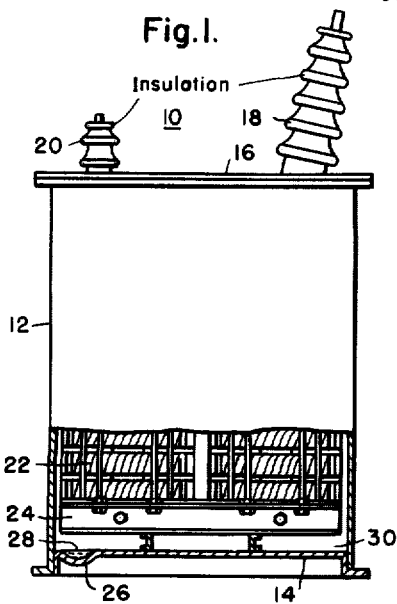
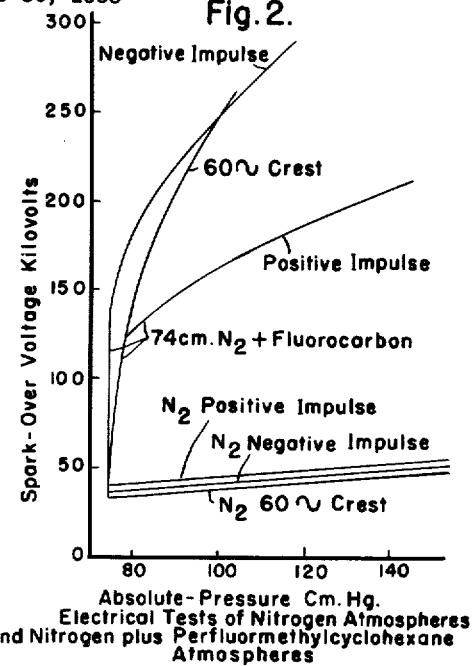
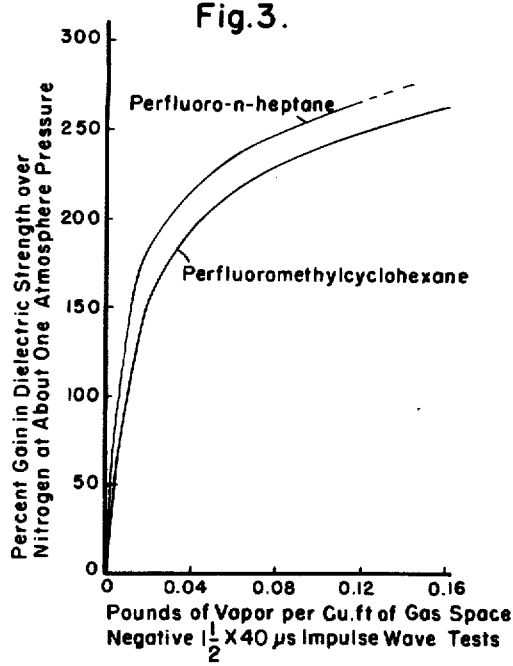
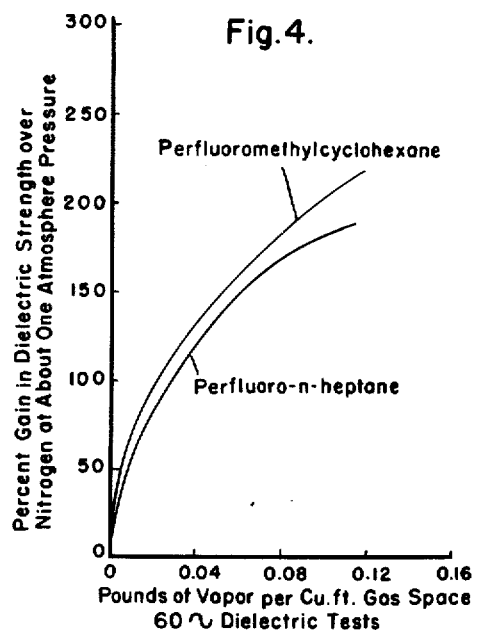
WITNESSES:
E. A. McCloskey.
Wm. D. Sellers.
INVENTORS
Leo J. Berberich
and Carroll N. Works.
BY
Frederick Shapoe
ATTORNEY United States Patent Office 2,849,525
Patented Aug. 26, 1958

2,849,525

COMPOSITE GASEOUS INSULATION CONTAINING HIGHLY FLUORINATED ORGANIC COMPOUNDS FOR ELECTRICAL APPARATUS

Leo J. Berberich and Carroll N. Works, Pittsburgh, Pa., assignors to Westinghouse Electric Corporation, East Pittsburgh, Pa., a corporation of Pennsylvania Application June 30, 1953, Serial No. 365,208

6 Claims. (Cl. 174—17)

This invention relates to electrical apparatus provided with a gaseous insulating atmosphere.

This application is a continuation in part of our co-pending application, Serial No. 102,248, filed June 30, 1949, now abandoned.

Electrical apparatus insulated with a gaseous dielectric, such as nitrogen, has been employed in the industry for certain applications where oil-insulated apparatus, for instance, is not suitable, particularly because of its fire hazard. However, nitrogen and similar insulating gases have a considerably lower dielectric strength and are inferior in other properties to liquid dielectrics. In particular, the dielectric breakdown strength of nitrogen gas is so much lower than most liquid dielectrics, such as oil or chlorinated aryl dielectric liquids, that the maximum voltage to which the apparatus may be subjected is much lower for the gas-filled units than for the liquid dielectric filled apparatus.

It has been proposed to employ certain gases under pressure in order to improve their dielectric breakdown strength. However, the pressures that are required to secure an adequate dielectric strength are so high that exceptionally strong casings must be employed and great care must be exercised in the gasketing and sealing of the joints in the casings. Any leak in the casing is usually fatal to the satisfactory operation of the apparatus. It will be appreciated that the danger of undesirable leakage increases rapidly with the increase in the pressure of the compressed gas atmosphere. Other dangers and disadvantages besides these are attendant upon with use of apparatus insulated with a gas under a high pressure.

The breakdown voltage of nitrogen gas at 25° C. at an absolute pressure of 760 mm. Hg, as determined by testing it with 60 cycle current in a cell between 0.5 inch diameter sphere electrodes spaced 0.20 inch apart is approximately 10 kilovolts. Using different test conditions, for example, with pointed or rod electrodes, the breakdown voltage of the nitrogen gas will exhibit variations of several kilovolts from this 10 kilovolt value. Also the roughness of the electrode surface affects the breakdown strength of a gas. In actual use in gas-filled electrical apparatus capable of breathing, normal variations in ambient temperature and barometric pressure will cause the breakdown strength values of nitrogen to vary over a range of two kilovolts or more—10 to 25% —from standard test values. Consequently, the design and building of gas insulated apparatus is based on expected variations of at least from 20 to 25% from the kilovolt breakdown values as determined by any given test or tests for the breakdown strength of nitrogen gas. Therefore an improvement in the dielectric breakdown strength of nitrogen gas of two or three kilovolts in 10 kilovolts, i. e. up to 25%, would be of no significance or usable benefit in practical applications by the industry. The designing and building of gas insulated electrical apparatus would not be modified or benefited by small increases of up to 25% in the dielectric strength of nitrogen or other gas. It is necessary to provide at least about 50% increase in the dielectric strength of a gas before the electric industry can secure a realizable advantage therefrom.

Accordingly, it is primarily highly desirable to provide a gas atmosphere for electrical apparatus wherein the pressure is maintained at substantially atmospheric pressure, or at most does not vary therefrom by more than a few pounds per square inch. It is also desirable that the dielectric strength of the gas atmosphere be sufficient to withstand voltages commercially employed in the electrical industry, namely, up to 33,000 volts and higher, whereas present day gas-filled electrical apparatus operated at about atmospheric pressure is limited to not exceed about 15,000 volts in most cases. In some instances, moderate pressures of around one to two atmospheres (gauge) may be employed in such casings if substantial improvement in dielectric strength is obtained to compensate for the problems encountered with sealing the casing.

It is further desirable that an insulating gas for electrical apparatus comprise available materials and be relatively inexpensive.

The object of this invention is to provide for increasing the dielectric strength by at least about 50% of nitrogen or other inexpensive, relatively non-condensable gas by incorporating therein small amounts of vapors of a stable fluorinated organic compound.

A further object of the invention is to provide gas-insulated electrical apparatus wherein a high dielectric strength composite insulating gas comprising a small percentage of vapors of a stable fluorinated organic compound and a major volumetric proportion of a relatively non-condensable gas, such as nitrogen, is present at substantially atmospheric pressures.

Other objects of the invention will in part be obvious and will in part appear hereinafter.

For a better understanding of the nature and objects of the invention, reference should be had to the following detailed description and drawing, in which:

Figure 1 is a view in elevation, partly in section, of a transformer;

Fig. 2 is a graph plotting spark-over voltage against absolute pressure for several gases;

Fig. 3 is a graph plotting percent gain in dielectric strength on a negative impulse wave test of certain fluorocarbon and nitrogen atmospheres in terms of pounds of fluorocarbon vapor per cubic foot of the nitrogen gas at 74 cm. mercury pressure; and Fig. 4 is a graph plotting present gain in dielectric strength on sixty-cycle tests of nitrogen by incorporating therein various amounts of fluorocarbon vapors per cubic foot of the nitrogen at atmospheric pressure.

In accordance with the present invention, it has been found that small amounts of vapors of selected fluorinated organic compounds may be combined with or introduced into a nitrogen, or other relatively non-condensable, stable insulating gas atmosphere, to provide a composite gas which has an increased dielectric breakdown strength unusually far above that of the nitrogen gas alone. Relatively small amounts of the vapors of the fluorinated organic compound have been found to improve the dielectric strength of nitrogen, for example, to such an extent that the electrical breakdown strength of the nitrogen gas atmosphere has been increased from 100% to 250% and higher.

Hereinafter nitrogen gas will be specifically referred to, but it will be understood other relatively non-condensable insulating gases may be substituted in whole or in part therefor.

In particular, it has been discovered that the dielectric breakdown strength of a nitrogen gas atmosphere may be increased about 50% and higher by incorporating therein the vapors of a selected fluorinated organic compound in an amount sufficient to give a partial pressure thereof of at least 3 mm. of mercury. From 0.003 to 0.25 pound of the fluorinated organic compound vapor present in each cubic foot of nitrogen gas at approximately atmospheric pressure will provide unexpected and unusual improvements in the dielectric strength of the nitrogen.

The vaporizable fluorinated organic compounds suitable for use in practicing the present invention comprise organic compounds with a total of at least four carbon atoms per molecule, selected from the group consisting of hydrocarbons, hydrocarbon ethers and tertiary hydrocarbon amines in which all of the hydrogen atoms have been substituted by at least one halogen selected from the group consisting of fluorine and chlorine, and at least 75 mole percent of the halogen comprises fluorine. The hydrocarbons and the hydrocarbon groups attached to oxygen and nitrogen in the ethers and the tertiary amines, respectively, may be aliphatic, aromatic, cycloaliphatic, aralkyl and alkaryl radicals to provide at least four carbon atoms and not exceeding twenty carbon atoms per molecule. The term "fluorinated organic compounds" will be employed hereinafter to refer to this class of compounds.

Fluorinated organic compounds with less than four carbon atoms have been found to be commercially unsatisfactory as gas-insulating dielectrics. The vapors of completely chlorinated aliphatic compounds, while possessing some fair dielectric strength, are unstable and decompose to an undesirable extent at elevated temperatures of, for instance, 100° C. and higher. Substitution of fluorine for chlorine in such one to three carbon atom compounds results in a substantial decrease in dielectric strength, the trend being to the least dielectric strength for a maximum amount of fluorine in the molecule. Thermal instability still exists in the chlorofluoro derivatives of the one to three carbon atom compounds.

Compounds having from one to three carbon atoms and having fluorine substituted for hydrogen have low dielectric strength. Thus, tetrafluoromethane ($CF_4$) does not differ significantly in dielectric strength from nitrogen and confers no substantial benefit when added to nitrogen. Tests comparing the dielectric strength of nitrogen and tetrafluoromethane between one-inch diameter spheres spaced ¼ inch apart using sixty-cycle current show no significant difference between them up to pressures of thirty pounds per square inch gauge.

In contrast thereto, we have found unexpected and unique dielectric strength values, when vapors of the fluorinated organic compounds having four and more carbon atoms are added in small amounts of nitrogen. Likewise there is present exceptional stability in the vapors of fluorocarbons, having four or more carbon atoms. The vapors of various aliphatic, cycloaliphatic, aryl, alkaryl and other hydrocarbon, ether and tertiary amine compounds, either completely fluorinated or perhalogenated to contain at least 75 mole percent of fluorine and the balance being chlorine, may be employed in combination with a large proportion of nitrogen, for example, with marked benefits in dielectric strength improvement. Perfluorinated cyclic compounds (the terms "perfluoro" and "perfluorinated" indicate that fluorine has replaced all the hydrogen atoms of the parent compound) are particularly satisfactory for producing such composite gas atmospheres when a small amount of the vapors thereof are combined with a large volume of nitrogen.

In order to provide a substantial and usable improvement of approximately 50% and higher over nitrogen alone, in the dielectric strength of a composite atmosphere containing nitrogen gas as the main volumetric component, there must be present in each cubic foot at least 0.003 pound of the vapors of the fluorinated organic compound. At least this minimum quantity of the vapor must be dispersed in the nitrogen gas, under all normally expected condtions within the casing enclosing the electrical member. In order to maintain this higher level of dielectric insulating values, it is necessary to employ fluorinated organic compounds of such a nature and in such amount that at 25° C. they will provide a partial pressure of at least 3 mm. of Hg at 25° C. It is preferable that the fluorinated organic compound have a partial pressure of 10 mm. of Hg or higher at 25° C. if the electrical member is to be exposed to ambients of 0° C. or lower.

The boiling point of numerous perfluorinated hydrocarbons, hydrocarbon ethers and hydrocarbon amines, all with four or more carbon atoms, are quite low and the vapor pressures at 25° C. are 3 mm. of Hg, or higher. The progressive substitution of chlorine atoms for fluorine atoms in such perfluorinated compounds raises the boiling point a substantial amount for each chlorine atom added. Thus the substitution of three chlorine atoms for fluorine atoms in perfluorotoluene raises its boiling point from 102° C. to 207° C. However, the effect on vapor pressure at 25° C. by the progressive substitution of chlorine for fluorine in perfluorination compounds is even more serious. While perfluorotoluene has a vapor pressure of approximately 23 mm. of Hg at 25° C., and the vapor pressure of dichlorotrifluoro(trifluoromethyl) benzene is 5 mm. at 25° C., the vapor pressure of trichlorodifluoro(trifluoromethyl) benzene at 25° C. is less than 0.5 mm. of Hg. The latter compound would be entirely unsuited for the practice of the present invention.

The following fluorinated compounds are suitable for the practice of the invention:

*Table I*

| Compound | B. P., ° C. | Vapor pressure at 25° C. in mm. of Hg |
|---|---|---|
| Perfluoromethylcyclohexane | 76.3 | 110–120. |
| Perfluorodimethylcyclohexane | 101 to 102.6 | 39. |
| Perfluoronaphthalane | 140 | Circa 20. |
| Perfluoro-1-methylnaphthalane | 161 | Circa 10. |
| Perfluoro-2-methylnaphthalane | 161 | Do. |
| Perfluorodimethylnaphthalanes | 177 to 179 | Circa 8. |
| Perfluoroindane | 116 to 117 | Circa 25. |
| Perfluorofluorane | 190 | Circa 3. |
| Perfluoroethylcyclohexane | 101 | About 150. |
| Perfluoro-m-diethylcyclohexane | 145 | 42. |
| Perfluoropropylcyclohexane | 125 | 90. |
| Monochlorotetrafluoro (trifluoromethyl) benzene | 137 | 10. |
| Perfluorobicyclo(2.2.1)heptane | 170 | |
| Perfluorotoluene | 102 | 23. |
| Perfluoro-n-heptane | 82 | 110. |
| Perfluorodimethylchlorocyclohexane | 129 | 21. |
| Chloropentadecafluoroheptane | 96 | 82. |
| Perfluorodibutyl ether | 100 | 33. |
| Perfluoro-N-tributylamine | 178 | 3. |
| Perfluorotriethylamine | 71 | 135. |
| Dichlorotrimethyl(trifluoromethyl)benzene | 170 | 5. |
| Perfluorotri-n-propylamine | 129 | Over 3. |
| Perfluorodicyclohexylether | 175 | Do. |
| Perfluorinated cyclic ether $C_8F_{12}O$ | 56 | Over 100. |
| Perfluorinated cyclic ether $C_8F_{16}O$ | 101 | 37. |
| Perfluoro-1-ethylnaphthalane | 178 | Over 3. |

[1] 746 mm.

The compounds listed above are exemplary and not exhaustive of suitable fluorinated organic compounds for use in small proportions for improving the dielectric breakdown strength of nitrogen.

It will be apparent that the fluorinated organic compounds of the present invention are liquids at temperatures of about 25° C. However, when small amounts of the liquid fluorinated organic compounds are introduced into a sealed casing in the amounts indicated above, a large proportion or even all of the compound, depending on how much is present per cubic foot of casing gas volume, will evaporate because of the vapor pressure of the compound being at least 3 mm. of Hg at 25° C. Since the compounds will be used in association with electrical apparatus that gives off considerable quantities of heat in use, the gas atmosphere within the casing will be considerably above room temperature when in use, and under these conditions a substantial partial pressure of vapors of the fluorinated organic compound will be present in the casing. When the liquid evaporates completely, the partial pressure at a given temperature thereof will depend only on the amount of fluorinated organic compound present per cubic foot of casing gas volume. Some compounds, particularly if employed in the maximum amounts indicated, may condense under conditions where the apparatus is not operating and the ambient temperature becomes low. The selection of the compound should be guided by these considerations either by employing a low boiling point fluorinated organic compound which will have a sufficiently high vapor pressure even at sub-zero temperatures, or by selecting an admixture of two or more such compounds at least one of which has a high vapor pressure at low temperatures sufficient to provide a total of at least 3 mm. of mercury vapor pressure under such expected operating temperatures.

Referring to Figure 1 of the drawing, there is illustrated a transformer 10 typifying the gas-filled apparatus constructed and operating in accordance with the present invention. The transformer comprises an outer shell 12 fitted with a hermetically sealed bottom 14 and a sealed top 16 cooperating to produce a gas-tight enclosure for the electric operating elements of the transformer. The top 16 of the transformer is provided with bushings 18 and 20 for the high-voltage and low-voltage connections. It will be appreciated that the bushings are fitted to the casing with suitable hermetic seals to prevent escape of the gases within the casing. Within the casing are disposed windings 22 supported on a frame 24, disposed on the bottom 14. If desired, though not necessary, the bottom 14 may be dished to provide a depression 26 within which may be disposed a small quantity of fluorinated organic compound 28 which will vaporize and intermingle with the nitrogen or similar relatively permanent insulating gas atmosphere within the casing.

The space within the casing surrounding the windings 22 is filled with a composite insulating gas 30 which is essentially composed of (a) a major volumetric proportion, in terms of partial pressures, of a relatively permanent or non-condensable gas, that is, non-condensable during conditions of use, such as nitrogen, argon, neon, air, carbon dioxide or the like, or mixtures thereof, and (b) the balance being the vapors of one or more fluorinated organic compounds. The relatively non-condensable gas by itself, such as nitrogen, has limited electrically insulating properties at atmospheric pressure. The dielectric properties of nitrogen at 760 mm. pressure are sufficient only for providing adequate electric insulation at moderate voltages of not over 15,000 volts. The partial pressure of the nitrogen, for example, in the composite insulating gas 30 ordinarily will be of the order of 74 to 76 centimeters of mercury, though the pressure may be somewhat more or somewhat less, depending on the amount of fluorinated organic vapors present, the temperature within the casing, the strength of the casing, and other factors. The total pressure in the casing may reach two atmospheres at 25° C. In some cases the transformer casing may be provided with a vent which will release the gas if the pressure exceeds a certain predetermined limit, though this would be ordinarily undesirable since a portion of fluorinated organic vapors therein will be lost. Therefore, this venting expedient should only be employed under emergency conditions.

It should be understood that outstanding electrical insulating benefits are obtained with sealed electrical apparatus wherein the casings are filled with a composite insulating gas at substantially atmospheric pressure, i. e. 74 to 76 cm. of Hg, the gas comprising a major proportion of nitrogen gas and a minor portion of vapors of fluorinated organic compound. The insulation provided by the composite gas will be exceptional in that it will exceed the breakdown strength of nitrogen gas by at least 50%.

In constructing a transformer such as shown in Fig. 1 of the drawing in accordance with the present invention, after the transformer has been assembled and all of the joints sealed so that the casing is relatively gastight, the air present may be withdrawn in any one of a number of conventional ways, by flushing or by using heat and a vacuum pump, and replaced by a dry, inert, noncondensable insulating gas such as nitrogen. The reason for withdrawing air is principally to remove oxygen and water vapor to prevent oxidation of the insulation, which may comprise paper, resin, varnish, and the like, during operation at moderately high temperatures of up to 200° C. Suitable valved openings may be provided in the casing for this purpose. Thereafter, a weighted quantity of the liquid fluorinated organic compound may be introduced into the transformer casing where it will evaporate, depending upon the temperature of the casing and the vapor pressure of the compound. The fluorinated organic compound may comprise either one or a mixture of two or more compounds and should be in an amount of from 0.003 to 0.25 pound per cubic foot of gas space. While the fluorinated organic compounds have a much higher molecular weight than nitrogen, for example, the gases will mix thoroughly without any substantial segregation, particularly when the apparatus is in operation, due to natural diffusion and the effects of convection currents.

Referring to Fig. 2 of the drawing, there is illustrated the improvement in spark-over voltage, as determined in standard A. I. E. E. rod gap test apparatus, secured by adding varying small amounts of perfluoromethylcyclohexane to an atmosphere composed of 74 centimeters of Hg of nitrogen gas. The nitrogen gas alone will spark over at the voltages shown in the three lower parallel straight lines that are practically horizontal, the bottom line being determined by tests employing a sixty-cycle crest voltage, the intermediate line by tests employing negative 1½ × 40 microsecond impulse waves and the top line by tests by employing positive 1½ × 40 microsecond impulse waves. These three lines indicate that the sparkover voltage does not change markedly with increasing pressure of nitrogen. However, the addition of very small amounts of the perfluoromethylcyclohexane increases enormously the spark-over voltage both for positive and negative 1½ × 40 microsecond impulse waves and sixty-cycle crest voltage, as shown by the three upper curves.

In Fig. 3, there is plotted the percent gain in dielectric strength of nitrogen alone by incorporating varying amounts of perfluoro-n-heptane and perfluoromethylcyclohexane, respectively, in a nitrogen atmosphere as determined by testing with a negative 1.5 × 40 microsecond impulse wave. It will be noted that even as little as 0.003 pound of either fluorinated compound increases the dielectric strength from 60% to 80%, while 0.04 pound of either of the fluorocarbons in each cubic foot of nitrogen increases the negative impulse dielectric strength to approximately 200% of the value secured using nitrogen alone.

The curves in Fig. 4 show the gain in sixty-cycle crest dielectric strength values, over nitrogen alone, for gas compositions comprising one atmosphere of nitrogen and the indicated small amounts of perfluoromethylcyclohexane and perfluoro-n-heptane vapors, respectively.

The curves in Figs. 2, 3 and 4 indicate a most astonishing increase in dielectric strength obtained by the incorporation of the indicated small amouts of the vapors of the fluorinated organic compounds. Vapors of other fluorinated organic compounds give similarly unexpected improvements in dielectric strength when added to nitrogen. For example, 0.052 pound of monochloropentadecafluorodimethylcyclohexane added to each cubic foot of nitrogen gas at one atmosphere pressure increases the sixty-cycle crest dielectric strength 100% above that of the nitrogen alone, while the negative impulse dielectric strength is increased 171%. The addition of 0.06 pound of perfluorodimethylcyclohexane per cubic foot of nitrogen at one atmosphere absolute pressure increased the breakdown strength on tests with sixty-cycle crest voltage by 118%, while the 1.5×40 microsecond negative impulse wave dielectric strength increased 194%, respectively, in each case over the breakdown strength of nitrogen alone.

In one case, a series of composite gases was prepared by adding to each cubic foot of nitrogen gas at 760 mm. Hg, the indicated weight of the fluorinated compounds shown in the following Table II, and, upon testing each of the composite gas with 60 cycle voltage, using the A. I. E. E. standard rod gap with electrodes spaced 2 inches apart, the indicated gains in dielectric strength were obtained.

Table II

| Compound | Lbs. per cubic foot added | Percent gain over $N_2$ at 760 mm. Hg |
|---|---|---|
| Perfluoromethylcyclohexane | 0.03 | 111 |
| Perfluorotripropylamine | 0.03 | 106 |
| Perfluoroheptane | 0.03 | 104 |
| Perfluorocyclic ether-$C_8F_{16}O$ | 0.06 | 157 |

As an example of the practice of this invention, an X-ray image amplifier tube operating at 30,000 volts was filled with a composite gas at 76 cm. of total pressure, composed of nitrogen gas and 0.13 pound per cubic foot of the perfluorocyclic ether-$C_8F_{16}O$. The tube filled with this gas operated satisfactorily at this voltage. Nitrogen gas alone would not have been suitable for use in this application.

The fluorinated organic compounds are extremely stable under the temperature and electrical conditions to be expected in transformers and other electrical apparatus insulated therewith. By contrast, completely chlorinated aliphatic compounds, such as carbon tetrachloride decompose to an undesirable extent at their boiling point or at reasonable operating temperatures of electrical apparatus. Carbon tetrachloride is decomposed by the presence of corona and its decomposition products are very corrosive. Also the ordinary chlorofluoro derivatives of methane and ethane are decomposed by even rather weak corona and the decomposition products thus formed are very corrosive, attacking the insulation of the apparatus. The decomposition products of such chlorinated compounds include chlorine gas or hydrogen chloride which will react with the insulation present in the windings as well as the copper and cause severe corrosion and will lead to premature failure of the apparatus. Consequently, carbon tetrachloride and chlorofluoro derivatives of methane and ethane are useless for practical service.

Even under arcing conditions, the highly fluorinated organic compounds disclosed herein tend, at most, to form lower molecular weight compounds, such as unsaturated fluorocarbons, which are insulators in and of themselves and not harmful to the electrical elements for the insulation. The compounds are not sensitive to, and do not react with moisture or the materials that form a part of the electrical apparatus, and for this additional reason may be safely employed in electrical apparatus.

Apparatus constructed in accordance with the present invention is gas-filled but is preferably maintained at about atmospheric pressure so that it is safe and reliable as compared to any gas-filled sealed apparatus at present available in the trade. The tendency to leak is quite low due to the low pressure differences over the atmospheric pressures. Such apparatus may be employed in underground vaults, subways, vessels, electric locomotives and the like because of its outstanding safety and reliability. The design and sealing of the casings for such apparatus is simpler and more economical than apparatus operating at high pressures.

Electrical apparatus constructed in accordance with the present invention with a gaseous atmosphere composed of nitrogen, for example, and a fluorinated organic compound may be operated at far higher voltages than feasible with previously available apparatus insulated with a gas at atmospheric pressure. It will withstand lightning or other surges better than any previously known form of electrical apparatus. Other advantages will be apparent to those skilled in the art.

Since certain changes in carrying out the invention described herein may be made without departing from its scope, it is intended that all the matter contained in the above description shall be interpreted as illustrative and not in a limiting sense.

We claim as our invention:

1. Electrical apparatus comprising, in combination, a casing, an electrical conductor in the casing and a composite gaseous dielectric in the casing and surrounding the entire conductor and comprising the sole fluid dielectric for the conductor, the gaseous dielectric comprising nitrogen gas as the major volumetric component and from 0.003 to 0.25 pound per cubic foot thereof of the vapor of a fluorinated organic compound, the fluorinated organic compound selected from the group consisting of hydrocarbons, hydrocarbon ethers and tertiary hydrocarbon amines in which all of the hydrogen atoms have been substituted by at least one halogen selected from the group consisting of fluorine and chlorine, and at least 75 atom percent of the halogen being composed of fluorine, the fluorinated organic compound having a partial pressure of at least 3 mm. of mercury at 25° C., the molecules of the fluorinated organic compound having at least four carbon atoms, the vapors providing for an increase of dielectric strength of the gaseous dielectric of at least about 50% over that of the nitrogen alone.

2. Electrical apparatus comprising, in combination, a sealed casing, an electrical conductor in the sealed casing, and a composite gaseous dielectric at substantially one atmosphere pressure disposed in the sealed casing about the entire electrical conductor and comprising the sole fluid dielectric for the conductor, the gaseous dielectric comprising essentially approximately one atmosphere of nitrogen gas and the balance being vapors of a fluorinated organic compound at a partial pressure of at least 3 mm. of mercury at 25° C., the vapors composed of fluorinated organic compounds having at least four carbon atoms, the fluorinated organic compound selected from the group consisting of hydrocarbons, hydrocarbon ethers and tertiary hydrocarbon amines in which all of the hydrogen atoms have been substituted by at least one halogen selected from the group consisting of fluorine and chlorine, and at least 75 atom percent of the halogen being composed of fluorine, the vapors of the fluorinated organic compound providing for an increase in the dielectric strength of the composite gaseous dielectric of at least about 50% over that of the nitrogen alone.

3. An electrical transformer comprising, in combination, a sealed casing, an electrical winding and core in the casing, and a composite gaseous dielectric at substantially one atmosphere pressure disposed in the casing to insulate the electric winding and comprising the sole fluid dielectric for the winding, the gaseous dielectric at substantially one atmosphere comprising essentially approximately one atmosphere of nitrogen gas and the balance being vapors of a fluorinated organic compound at a partial pressure of at least 3 mm. of mercury at 25° C., the vapors composed of fluorinated organic compounds having at least four carbon atoms, the fluorinated organic compound selected from the group consisting of hydrocarbons, hydrocarbon ethers and tertiary hydrocarbon amines in which all of the hydrogen atoms have been substituted by at least one halogen selected from the group consisting of fluorine and chlorine, and at least 75 atom percent of the halogen being composed of fluorine, the vapors of the fluorinated organic compound providing for an increase in the dielectric strength of the composite gaseous dielectric of at least about 50% over that of the nitrogen alone.

4. Electrical apparatus comprising, in combination, a closed casing, an electrical conductor in the casing, and a composite gaseous dielectric at a pressure not exceeding two atmospheres at 25° C. disposed in the casing about the entire electrical conductor, the gaseous dielectric comprising a major volumetric proportion of nitrogen and the balance being fluorocarbon vapors having a partial pressure of at least 3 mm. of mercury, the fluorocarbon vapors composed of compounds having at least four carbon atoms.

5. Electrical apparatus comprising, in combination, a container, an electrical conductor in the container, and a gaseous dielectric at substantially one atmosphere pressure disposed in the container about the entire electrical conductor, the gaseous dielectric comprising essentially approximately one atmosphere of a relatively inert and permanent gas and the balance being vapors of a fluorinated organic compound at a partial pressure of at least 3 mm. of mercury at 25° C., the vapors composed of fluorinated organic compounds having at least four carbon atoms, the fluorinated organic compound selected from the group consisting of hydrocarbons, hydrocarbon ethers and tertiary hydrocarbon amines in which all of the hydrogen atoms have been substituted by at least one halogen selected from the group consisting of fluorine and chlorine, and at least 75 atom percent of the halogen being composed of fluorine, the vapors of the fluorinated organic compound providing for an increase in the dielectric strength of the composite gaseous dielectric of at least 50% over that of the inert gas alone.

6. Electrical apparatus comprising, in combination, a container, an electrical conductor in the container, and a composite gaseous dielectric at substantially one atmosphere pressure disposed in the container about the entire electrical conductor, the gaseous dielectric comprising essentially approximately one atmosphere of a relatively inert and permanent gas and the balance being vapors of a cyclic fluorocarbon at a partial pressure of at least 3 mm. of mercury, the fluorocarbon composed of compounds having at least four carbon atoms, the fluorocarbon vapors in the gaseous dielectric providing for an increase in the dielectric strength of the composite gaseous dielectric of at least about 50% over that of the permanent gas alone.

References Cited in the file of this patent

UNITED STATES PATENTS

| | | |
|---|---|---|
| 1,953,216 | Elsey | Apr. 3, 1934 |
| 2,221,670 | Cooper | Nov. 12, 1940 |
| 2,561,738 | Hill | July 24, 1951 |

FOREIGN PATENTS

| | | |
|---|---|---|
| 525,244 | Great Britain | Aug. 23, 1940 |
| 116,906 | Australia | May 13, 1943 |
| 553,569 | Great Britain | May 27, 1943 |

OTHER REFERENCES

Publication, General Electric Review (174–17.11), September 1937, vol. 40, No. 9, pages 438–442.